United States Patent Office 3,221,156
Patented Nov. 30, 1965

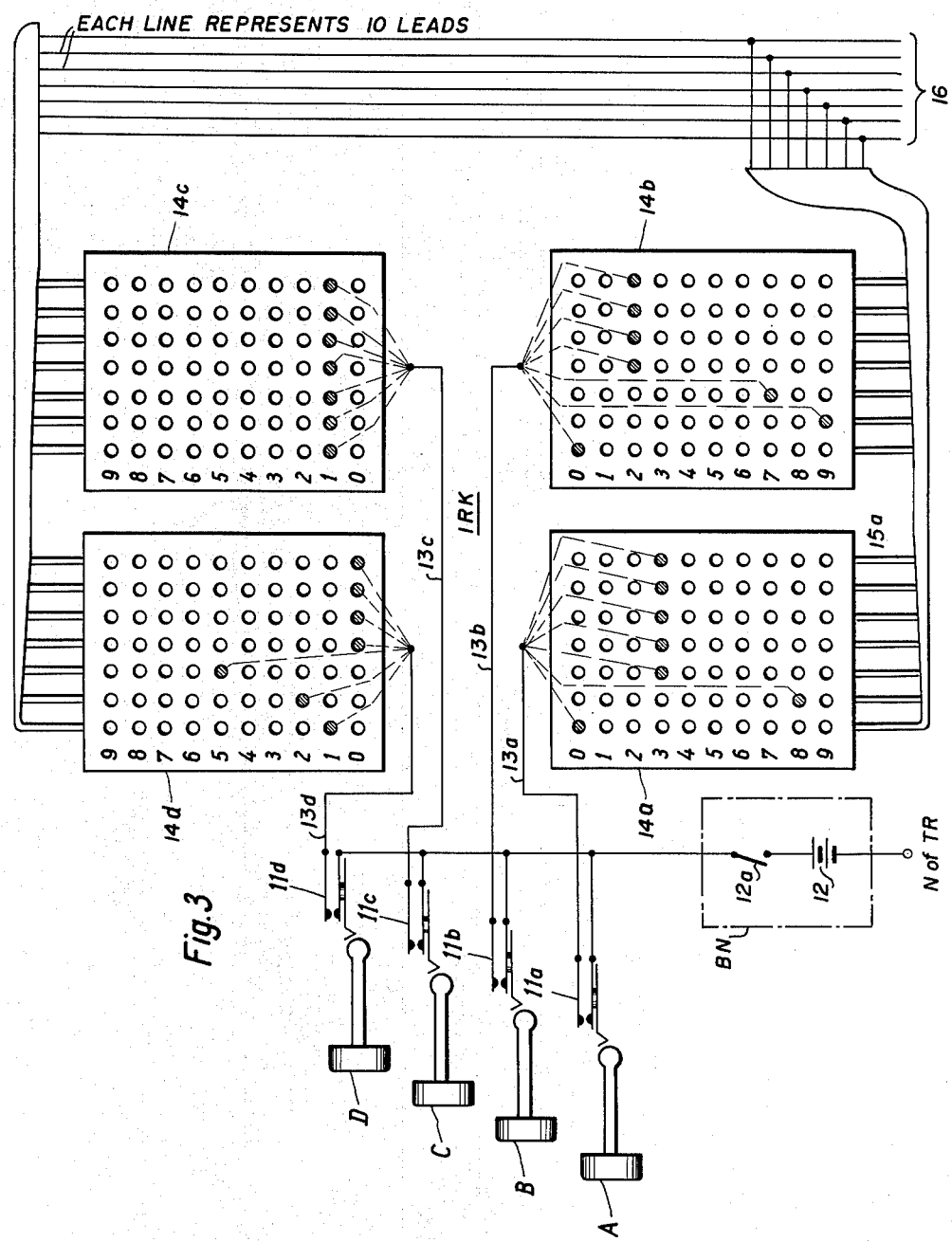

3,221,156
INTEREST-COMPUTING APPARATUS
Hans Engstfeld and Helmut Plate, Bielefeld, Germany, assignors to Anker-Werke A.G., Bielefeld, Germany, a corporation of Germany
Filed Jan. 26, 1961, Ser. No. 85,107
Claims priority, application Germany, Feb. 3, 1960, A 33,877
16 Claims. (Cl. 235—160)

Our invention relates to business machinery for accounting purposes and, more particularly, to apparatus for use in combination with such machinery for determining amounts of interest in accordance with a given interest rate and the period of time for which such interest is due.

The computation of amounts of interest constitutes one of the more laborious jobs to be done in banks, savings banks, loan and credit institutions and the like. According to the progressive type of interest computation, the amounts of interest corresponding to each change in an account up to a given terminal date, usually up to the end of a calendar year, are read from a tabulation and are entered by hand on the account card. When such entries are made, attention must be given to the fact that debit and credit entries to the account must be differently treated interestwise. For example, fifteen days may have to be subtracted from the interest period when a credit entry is made. The interest amounts indicated in the tabulation are determined by multiplication of an "interest figure" with an "interest time factor." The interest figure is defined by $1/360$, the (360 being the number of interest days per year) of the product formed by the capital turn-over times the number of interest days up to the terminal date. That is, the amount of interest (Z) is calculated in accordance with the equation $$Z = \frac{K \cdot t \cdot p}{100 \cdot 360}$$

wherein K denotes the amount of capital on which interest is due, $t$ the number of interest days, and $p/100$ the percentile rate of interest. After thus determining the amount of interest, depending upon whether a cerdit or debit item is involved, this amount is entered into the account.

A determination of the interest amounts in the above-described manner by personnel, relative to individual changes in an account, is time consuming, considerably susceptible to errors and hence often a cause of aggravation.

In cases where the individual accounts are carried in form of mechanically scannable item cards, it is known to compute the amounts of interest by machine in accordance with the so-called stacking method. This practice has the disadvantage that the accounts are balanced with respect to amounts of interest only in intervals of a month, calendar quarter or the like fixed periods so that the accounts, as a rule, are never balance-ready, aside from the fact that the expenditure for the required group of machines, such as punching, sorting and tabulating machines, is too high to be economical for medium-size or small enterprises.

It has also become known to provide for mechanical interest computation by means of a business machine equipped with an electronic computer, and to take into consideration the different lengths of time to be applied for the computation of debit and credit interests. This machine employs the data storer mechanisms, usually serving other purposes, for memorizing the interest factor $$\frac{t \cdot p}{100 \cdot 360}$$

one the interest rate $p$ (for example 3%) being assigned to one data storer mechanism, another interest rate (for example 3½%) to another data storer, and so forth. By entering the capital turnover into the computer and by also entering the interest factor, the amount of interest is determined by the computer. However, the interest factor $$\frac{t \cdot p}{100 \cdot 360}$$

constitutes a variable magnitude because the interest days $t$ are different from date to date. For that reason, a different interest factor of no conspicuous or visibly simple relation to the calendar date must every day be entered into the memory mechanism.

It is an object of our invention to simplify the equipment needed for interest computation purposes of the above-mentioned general type and to reduce the possibility of human error inherent in the necessity of known equipment to enter daily a different interest factor into the equipment.

Another object of our invention is to devise interest-computing equipment that can be used together with, or as an accessory of, accounting machines and digital computers already available for business purposes.

According to a feature of our invention, based upon the consideration that the above-mentioned interest factor comprises the constant term $$\frac{p}{100 \cdot 360}$$

we incorporate this constant term into the operation of an interest-rate setting device which, upon being selectively set simply to the desired percentile rate of interest, issues the complete interest factor to a standard computer; and we provide the interest computing equipment with only one other selective posting means, namely with a device, preferably of the keyboard type, for entering into the computer a time factor indicative of the number of interest days. Since this number is simply an indication of the calendar date, and the interest rate, as a rule, is either constant or may assume only one or two or a few different values, the two posting operations to be performed or checked by personnel are of utmost simplicity and obviousness and the possibility of error is accordingly greatly diminished. This is particularly so since the rate of interest, once properly posted, need not be changed for many days or months thus virtually eliminating the possibility of wrong entries in this respect.

According to another feature of our invention, we provide selective interest-rate setting means in connection with a digital multiplying computer to supply thereto a first factorial input, and a time-factor entering device which comprises selectively actuable credit-identifying means and debit-identifying means as well as selectively actuable date-posting means. The time-factor entering device has digital output circuits connected to the computer to supply thereto a second factorial input, and the circuitry of the entering device comprises discriminating means which connect the output circuit with the rate-posting means under control by the identifying means so as to give the second computer input respectively different values depending upon which of the two identifying means is active at a time. As a result, the computer furnishes a product value indicative of the amount of interest per capital unit.

According to still another feature, we connect the same computer with the business machine in which the amount of capital, on which interest is due, is posted or registered, this amount constituting another factor which is supplied to the computer and multiplied therein with the above-mentioned result to furnish an ultimate output magnitude corresponding to the amount of interest due. This ultimate output value can be supplied back into the accounting machine, namely to its totalizing devices and printers to appear in the balance of the account to be drawn in the machine and to be printed on the account card or other voucher.

According to a more specific feature of our invention, the above-mentioned interest-rate setting means may comprise selectively actuable control keys in electric connection with socket panels into which respective plugs can be selectively inserted. Another way of designing the interest-rate setting means is to provide a multi-socket panel into which a number of multi-pin plugs can be selectively inserted, the pins being differently interwired in the respective plugs, to establish the particular digital circuit connections necessary for setting the different interest rates to which the respective plugs are assigned. The interest-rate setting means may also be constituted by a selector switch so that it is only necessary to set the switch to a position corresponding to the selected interest rate, in order to establish the necessary digital circuit connections with the computer.

The above-mentioned time-factor entering device, according to further features of our invention, preferably comprises a digital group of depressable keys as ordinarily used in business-machine keyboards, each key serving to actuate electric contacts. The contacts of the various keys are interwired in such a manner that the digital output circuits furnish to the computer an input value which, for example in the case of debit interest, corresponds to the posted number of calendar days, but which differs from the posted number of days a given amount, for example fifteen days, when credit interests are involved.

The just-mentioned time-factor entering device may be provided with tens-transfer means, preferably in form of relays, for properly furnishing the reduced value required for credit interests even if the two last digits of the day number are less than the amount to be deducted.

The above-mentioned and other objects, advantages and features of our invention, said features being set forth with particularity in the claims annexed hereto, will be apparent from, and will be described in, the following with reference to the embodiments of interest-computing apparatus according to the invention illustrated by way of example on the accompanying drawings in which:

FIG. 3 is an electric circuit diagram of the interest-rate setting device IRK.

Figure 4A:
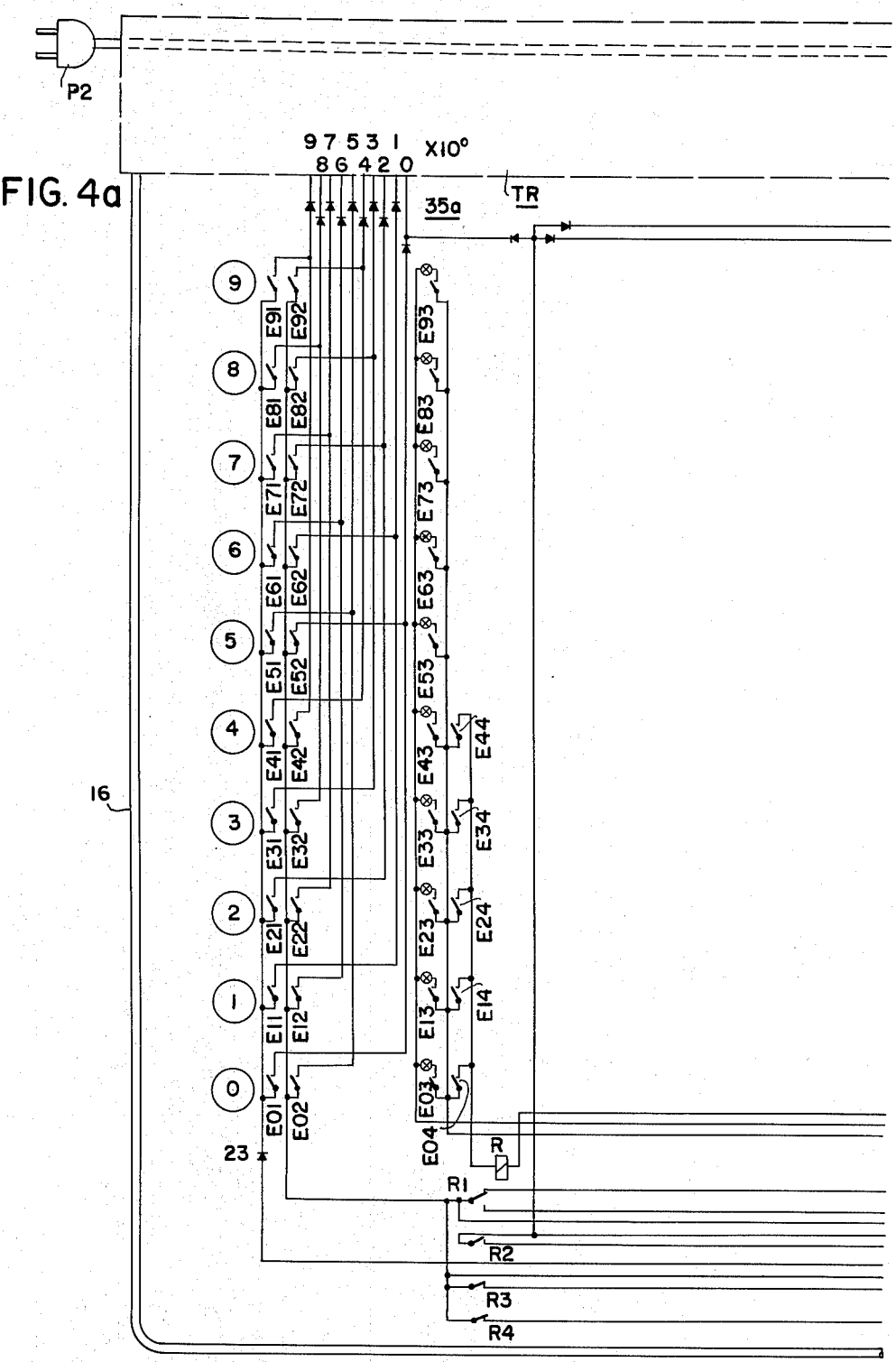
Figure 4B:
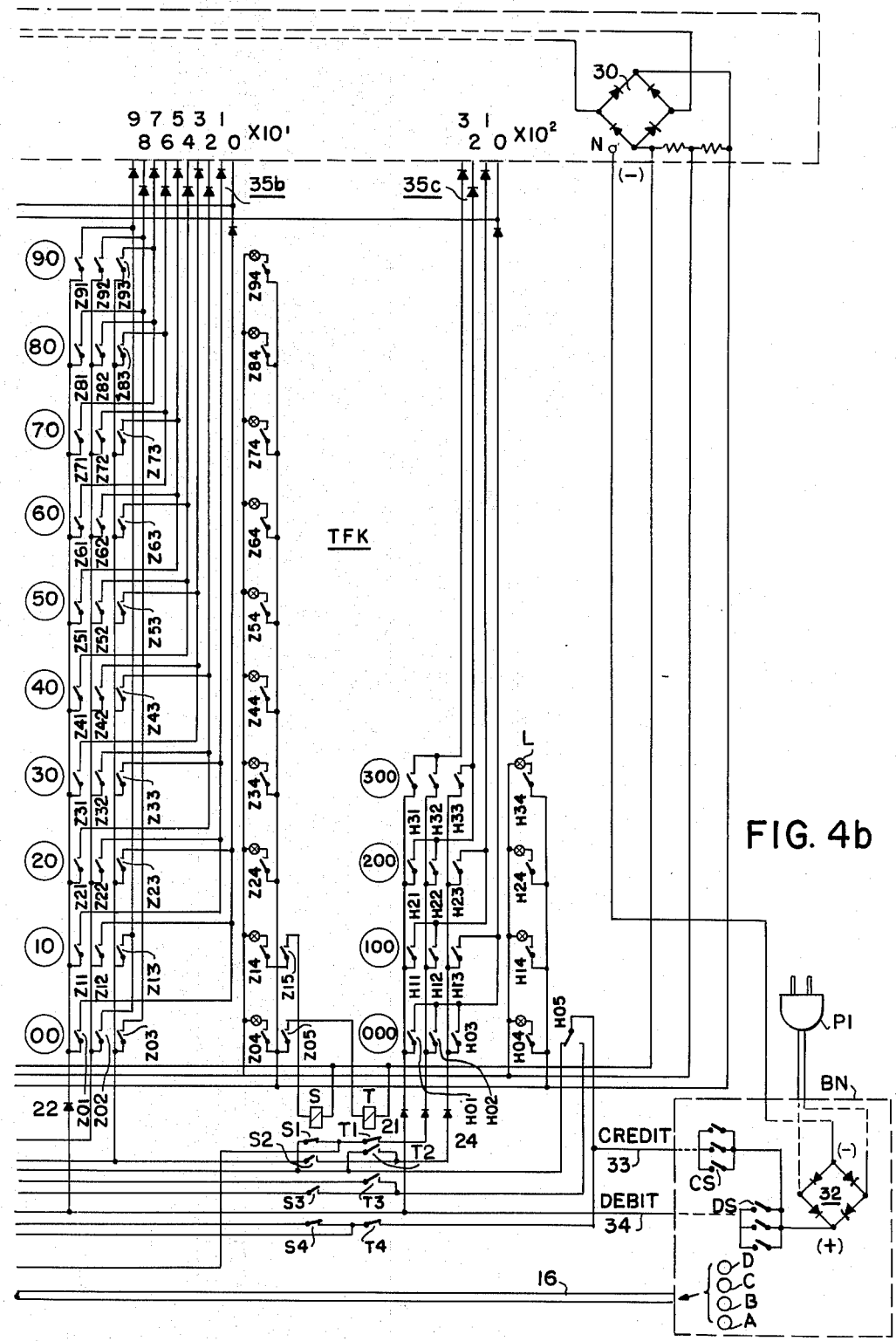

FIGS. 4a and 4b, of which the latter is to be placed at the right of FIG. 4a to form a single circuit diagram together therewith, illustrate the internal circuitry of the time-factor setting device TFK, these two illustrations being hereinafter collectively referred to as FIG. 4.

Figure 5:
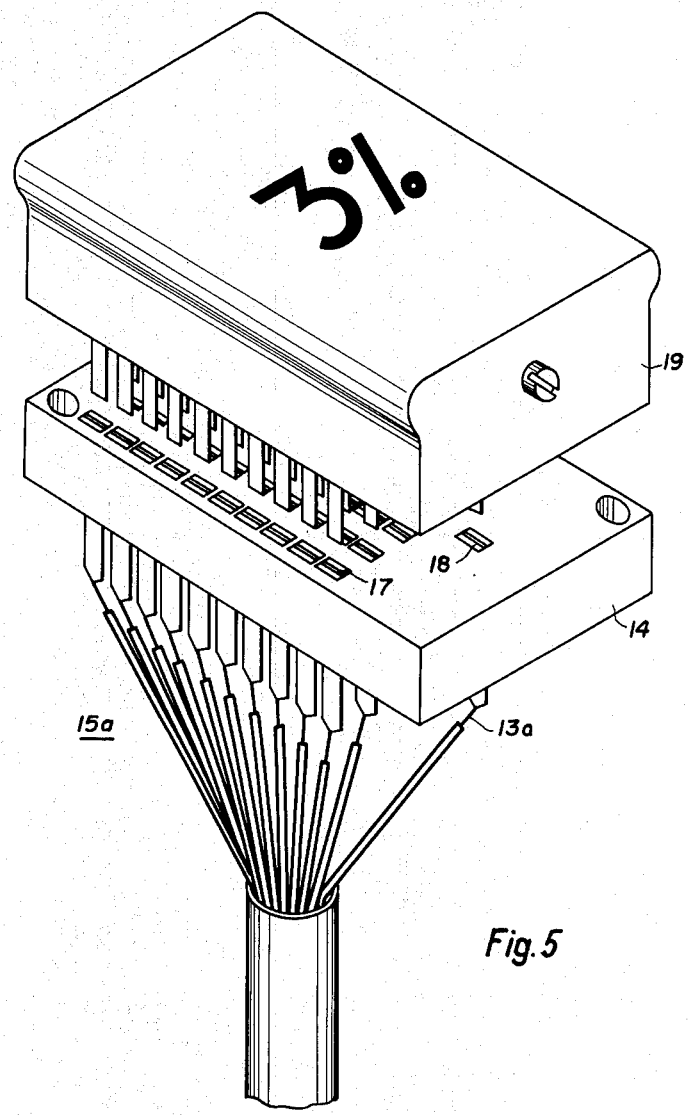

FIG. 5 illustrates in perspective a modified interest-setting device applicable in lieu of the one shown in FIG. 3.

Figure 6:
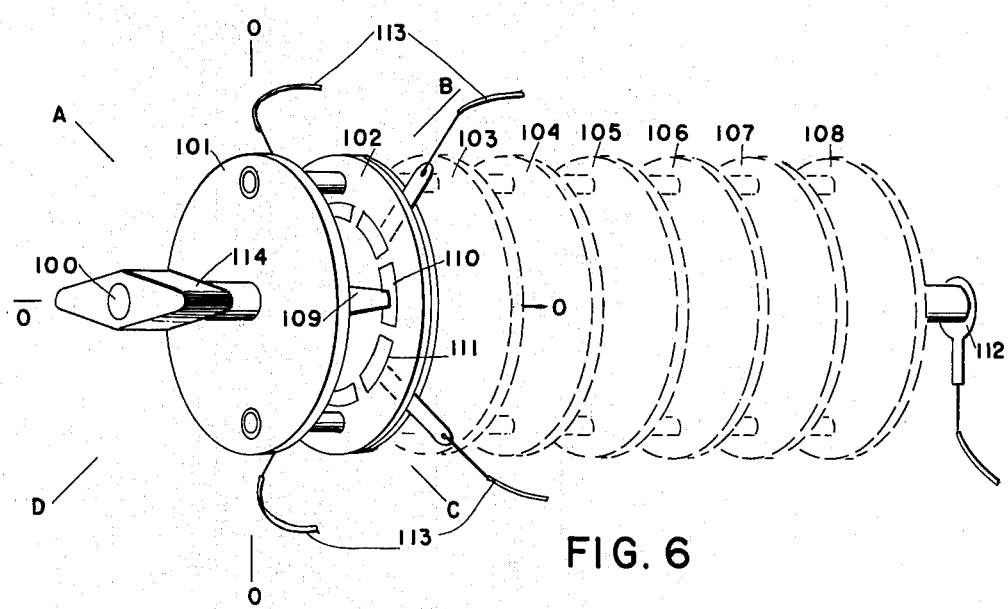

FIG. 6 shows schematically another modification of the interest-rate setting device applicable in lieu of the one shown in FIG. 3.

Figure 7:
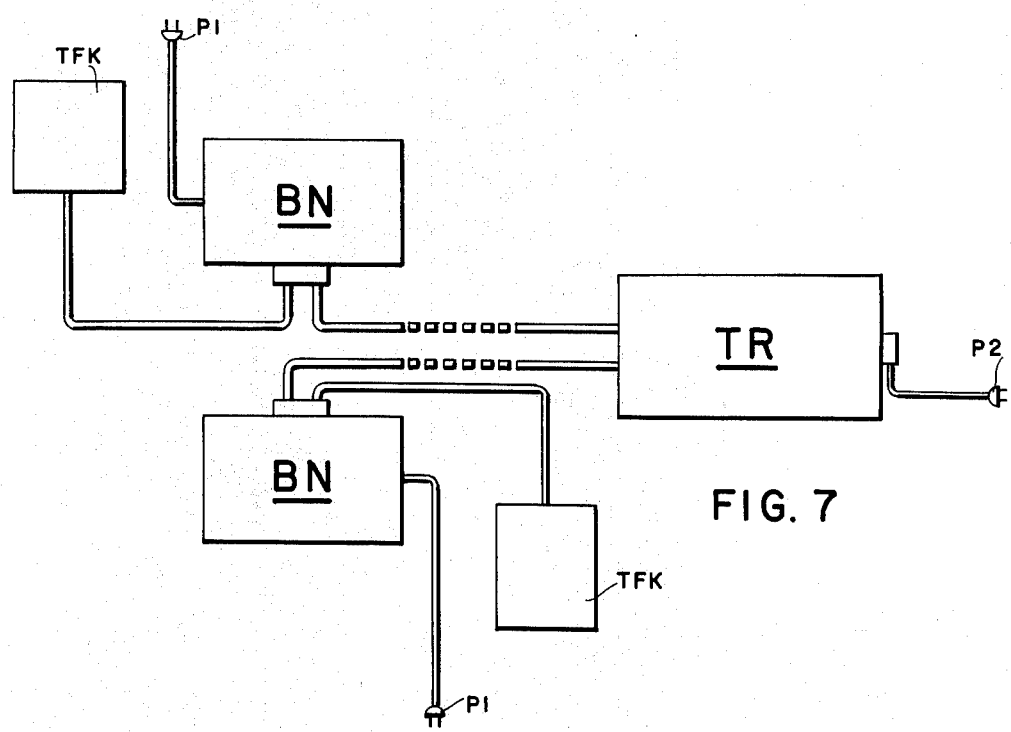

FIG. 7 is a block diagram of an assembly which comprises two accounting machines with respective time-factor entering devices connected to a single multiplying computer.

Before dealing with the invention proper, it will be helpful to understand that the accounting machine illustrated and described herein may be of generally known and conventional design, with the exception of the embodiment, hereinafter described, in which the interest-rate setting means consist of keys that are incorporated into the keyboard of the accounting machine rather than constituting part of a separate apparatus unit. The particular business machine illustrated and described herein is an accounting machine available in the trade from Anker-Werke A.G., Bielefeld, Germany, under the type designation BN5000. While some details of this machine, insofar as they are essential to the present invention proper, will be described hereinafter, various other details of the same machine, not part of the invention and not specifically described in this application, are known, for example, from U.S. Patents Nos. 2,681,616, 2,698,660, 2,765,116, 2,787,953 and 2,825,561 as well as in the copending application Serial No. 624,241, filed November 26, 1956, now Patent No. 3,012,717, dated December 12, 1961, and other U.S. patents, all assigned to Anker-Werke A.G.

The electronic computer denoted by TR in the drawings is likewise known as such and is available from the same source under the type designation TR10000. This is a transistorized computer which can be used for the purposes of the invention without change and for that reason is described herein only with respect to its connection with the other components of the equipment according to the invention. The computer is of the digital type having for each digit a group of ten input wires, the digit value being determined by which of the ten leads in each digit group is energized at a time. The output of the computer is likewise available in digital form, each digit being constituted by a group of ten output terminals so that the digit value is determined by which of these terminals is energized at a time.

Figure 1:
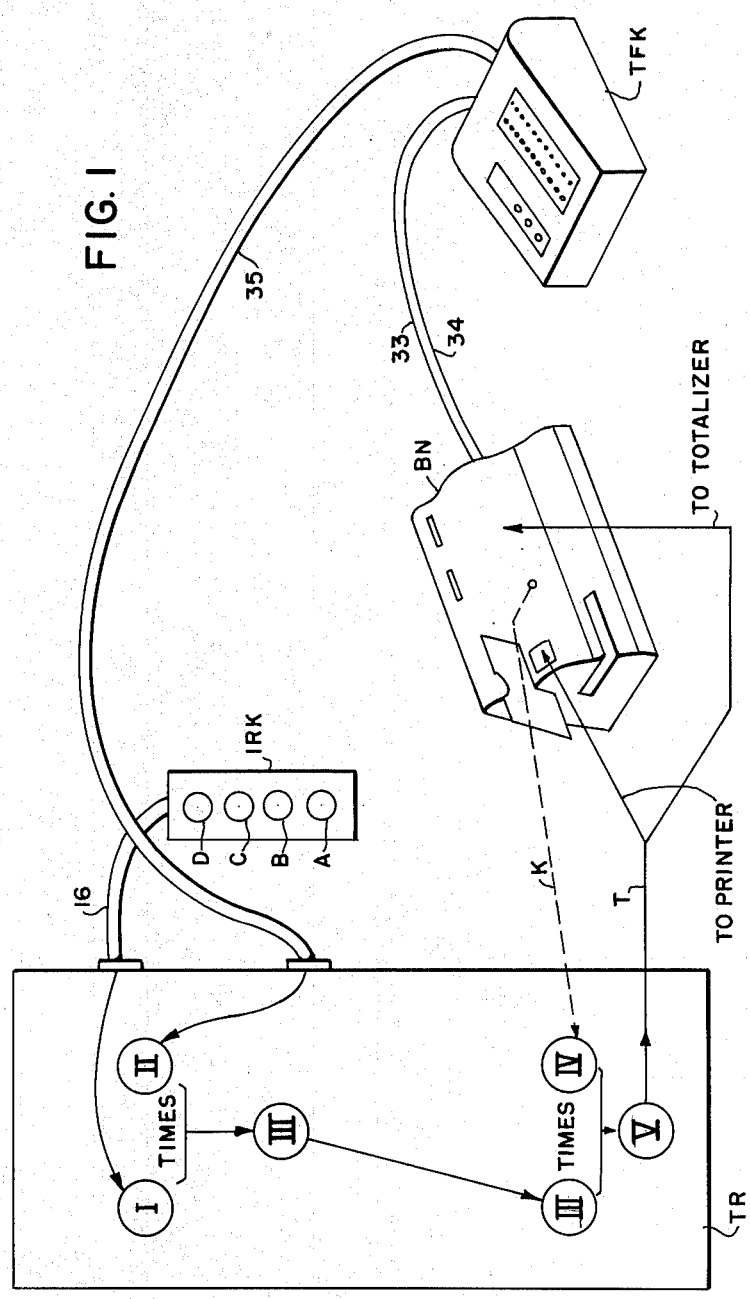
FIG. 1 shows schematically a complete assembly of interest computing equipment according to the invention comprising a conventional electronic digital computer TR, a conventional accounting machine BN, interest-rate key assembly IRK, and a time-factor entering device TFK.

As shown in FIG. 1, the computer TR has one cable of input wires 16 connected with an interest-rate setting device IRK which comprises four selectively actuable keys A, B, C, D, the keys correspond to different respective interest rates, for example 3%, 3½%, 4% and 4½%. In the device IRK, the interest rate is automatically multiplied with a fixed factor which represents the value $$\frac{1}{360 \cdot 100}$$

The interest factor "I" thus formed is multiplied in the computer TR with a term factor "II" which is supplied by a second cable 35 of input leads from the time-factor setting device TFK. This device has a keyboard which comprises three digital groups of keys, namely a group of ten keys for the unit digit, ten keys for the tens digit, and four keys for the hundreds digit. These keys are denoted by encircled numerals (0) to (9), (00) to (90) and (000) to (300) in FIG. 4. They are to be depressed in accordance with the number of the particular day.

The multiplication in the computer TR of the factors "I" and "II" furnishes a result "III" which constitutes the amount of interest per dollar or other unit of capital on which interest is due. It is preferable to connect the computer by another group of input leads, symbolically denoted in FIG. 1 by a broken line K, with the balance registering mechanisms of the accounting machine BN so that the computer directly furnishes, by multiplication of factors "III" and "IV," a result "V" which indicates the amount of interest due. Preferably, the output leads of the computer are connected with the printer and totalizer of the accounting machine BN as schematically indicated at T in FIG. 1, so that the amount of interest is entered into the accounting machine to appear on the account card or other voucher.

For simplicity, the interest-rate setting device IRK is shown in FIG. 1 as a unit separate from the accounting machine BN and separate from the time-factor setting device TFK. Indeed, if desired, the device IRK may be designed as such a separate unit. However, it may also be combined either with the time-factor setting device TFK or with the accounting machine BN. The latter embodiment is described below in accordance with FIG. 2.

Figure 2:
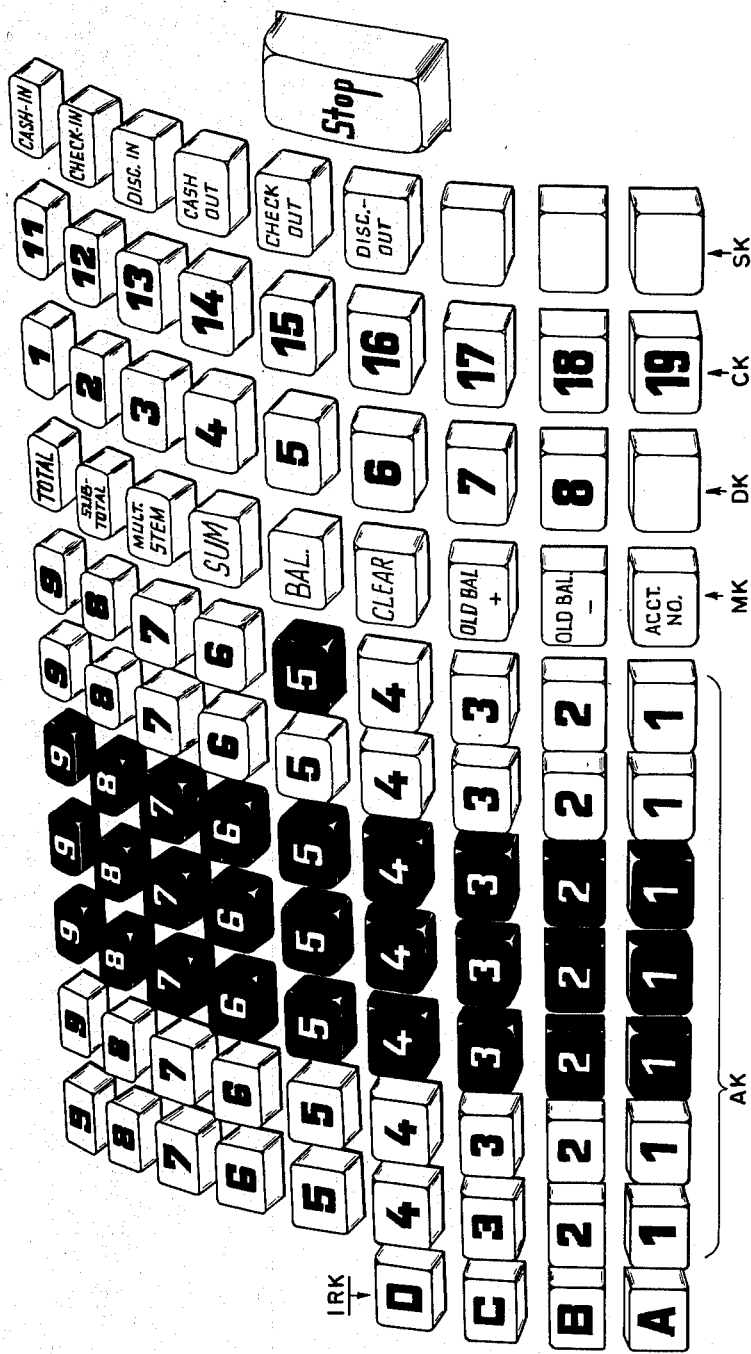
FIG. 2 illustrates in perspective the keyboard of the accounting machine BN and shows the interest-rate keys IRK incorporated in the same keyboard.

According to FIG. 2, the interest-rate keys A, B, C, D of device IRK are incorporated into the keyboard of the accounting machine which is otherwise conventional in containing a digital group of amount-posting keys AK, a bank of motorized control keys MK whose actuation releases a selected registering and accounting operation, a bank of keys DK for registering debit operations, a bank of keys CK for registering credit operations, and a bank of special keys SK for selection of adding mechanisms. Only one key in the two banks DK, CK, and only one key in each individual other bank can be depressed at a time. As regards the operations set and released by these keys, the machine is conventional. Relative to the invention, however, it is of interest that actuation of a selected debit key in bank DK also closes a corresponding electric switch contact, though such contacts being schematically shown at DS in FIG. 4, and actuation of a credit key in bank CK closes a corresponding switch contact DS schematically shown in FIG. 4, as will be more fully described in a later place.

Like the keys of the other banks, the keys A, B, C, D (FIG. 2) are mutually interlocked in the manner conventional in business machines so that only one key can be depressed at a time and remains locked in depressed position until another key of the same group is being depressed. Each of these keys, when depressed, closes an electric switch contact $11a$, $11b$, $11c$ or $11d$ (FIG. 3). Under control by a switch $12a$, actuated in the accounting machine BN, the selectively closed contacts $11a$ to $11d$ then connects voltage from a current source 12 to a selected one of four leads $13a$, $13b$, $13c$, $13d$. Each of these leads is connected by flexible cords, shown as broken lines, with seven contact plugs that can be selectively inserted into the sockets of a socket panel $14a$, $14b$, $14c$, $14d$, each of these panels being correlated to one of the respective keys A, B, C, D.

In the embodiment of FIG. 3, each panel is shown to have seven vertical rows each comprising ten sockets denoted by 0 to 9. Each row corresponds to a digit position of a seven-digit interest factor. Each of the seven plugs appertaining to an individual socket panel is to be inserted in a selected one socket of each of the respective seven vertical rows of sockets. For example, the numerical value plugged in panel $14a$ corresponds to 083333. As will be explained, this seven-digit number corresponds to the rate of interest that can be posted by depressing the key A, and the value assigned to each key can be set or changed as desired.

Ten electric leads are connected to the respective ten sockets in each digital row of each socket panel. Thus, ten such leads extend from the respective ten sockets in the unit-digit row on the right-hand side of the panel $14a$. These ten leads are collectively denoted by $15a$ in FIG. 3. Ten corresponding leads extend from the ten sockets of the tens-digit row and so forth, so that a total of seventy leads issues from the socket panel $14a$.

The same number of seventy leads issues from each of the three other panels $14b$, $14c$, $14d$. The seventy leads from each panel are manifold connected with the seventy leads from each other panel. That is, the panels are all electrically connected in parallel relation to a total of seventy leads, collectively denoted by 16, which extend in form of a single cable from the interest-rate setting device IRK to the computer as shown in FIG. 1.

The four socket panels $14a$ to $14d$ may be mounted within the enclosure of the accounting machine BN or in the desk or cabinet on which the accounting machine is mounted. The panels need not necessarily be readily accessible to the operating personnel because once they are properly set it is not necessary, as a rule, to change the setting for long periods of time. Hence, the panels need be accessible only to servicemen.

The reason for providing a selection of a seven-digit number in the interest-rate setting device IRK will appear from the following.

As mentioned, the calculation of the amount of interest is in accordance with the equation: amount of interest=capital+number of days+interest rate+$\frac{1}{360}$. In order to simplify the multiplication in the computer, the two last members of the equation are combined. The value thus resulting is multiplied with a power of ten in order to obtain an integral multiple-digit result as the interest figure, and also for the purpose of fully utilizing the digital capacity of the electronic computer TR being used, so that the final result is as accurate as possible. The last-mentioned multiplication is then automatically corrected in the computer by a corresponding decimal-point displacement in the ultimate result. The interest formula thus is reduced to three integral factors which can be processed in the computer by a sequence of the two multiplications described above.

It will be understood from the foregoing that, for setting the socket panels $14a$ to $14d$ according to FIG. 3 to the desired respective interest factors, each rate of interest is represented by a multi-digit figure, in this case up to seven digits. For example, if the key A in the keyboard of the accounting machine (FIG. 2) is to be correlated to the interest rate of 3%, then, when employing a seven-digit computer TR, the value to be plugged on the socket panel $14a$ is $$\frac{3 \cdot 10^{10}}{100 \cdot 360} = 0833333$$

Illustrated in FIG. 3 are the following settings: $A=3\%$, $B=3\frac{1}{2}\%$, $C=4\%$, and $D=4\frac{1}{2}\%$.

Under control by the business machine, namely by closing of switch $12a$ (FIG. 3), voltage from source 12 is applied to the corresponding input digital terminals of the electronic computer TR in accordance with the numerical value of the interest figure indicative of the percentage values just mentioned.

As explained, the result "III" of the multiplication in the computer is multiplied with the amount "IV" on which interest is due, and the ultimate result "V" is returned from the computer TR to the business machine BN to be processed in that machine. The connections K, T (FIG. 1) between the computer TR and the registering business machine BN are of the same digital type as described above with reference to FIGS. 3 and 4. That is, each of these connections comprises ten leads for each digit of which a selected one is energized at a time to convey one digit value for each of the respective digits of the amount being transmitted.

As mentioned, differently long interest periods are taken into account for debit and credit interests respectively. For example, debit interest may be counted from the day of the corresponding change in account, whereas credit interests are paid only beginning with the fifteenth day, for example, after the credit payment is made. The term-factor device TFK according to the invention is designed to mechanically compute the time factor without requiring the attending personnel to first deduct fifteen days and to correspondingly change the data posted into the device TFK. How this is automatically accomplished will be described presently with reference to the circuit diagram of device TFK illustrated in FIG. 4.

The keys denoted by the encircled numerals 0–9, 00–90 and 000–300 actuate a number of normally open electric contacts. The contacts actuated by the keys in the hundreds group (000, 100, 200, 300) are prefixed by the letter H. For example, the key 000 controls the contacts H01 to H05. The contacts actuated by the keys 00 to 90 in the tens group are prefixed by the letter Z. For example, the key 10 actuates the contacts Z11 to Z15. The contacts actuated by the keys 0–9 in the unit group are designated by a prefixed E. For example, the key 2 actuates the contacts E21 to E24.

The network of electric switch contacts is further controlled by the contacts R1 to R4 of a relay R, the contacts S1 to S4 of a relay S, and the contacts T1 to T4 of a relay T. The coil circuits of the relays R, S, T are energized from a current supply 30 in the computer TR. The device is shown equipped with pilot lamps such as the one denoted by L. These lamps are also energized from the current supply 30. The three groups of output leads denoted in FIG. 4 respectively by 35a, 35b and 35c receive energization from a current supply 32 through a credit line 33 under control by a credit switch contact CS, or through a debit line 34 under control by a debit switch contact DS. The digital circuits 35a, b, c shown in FIG. 4, and the digital circuits 15a, 16 shown in FIG. 3 are completed by connection of the respective current sources to a return or zero terminal N of the computer TR.

While separate current sources are shown at 12 (FIG. 3) and 32 (FIG. 4), they may consist of a single power supply unit energized from a utility line to which the machine BN can be connected by means of a flexible cord with a connector plug P1 (FIG. 4). The source 30 in the computer is likewise a power supply unit energized from the utility line by means of a cord with a connector plug P2.

The output leads 35a, 35b and 35c are schematically illustrated in FIG. 1 by a single cable connection 35 connecting the term-factor setting device TFK with the computer TR.

The wiring of the time-factor setting device TFK according to FIG. 4 is such that when the output leads 35a, b, c are energized through the debit line 34, the actually posted value appears in the corresponding outlet leads 35a, b, c, whereas when the network is energized through the credit line 33, the value represented by the energization of the output leads is diminished by fifteen units with respect to the value actually posted into the keys of the device TFK. The relays R, S and T operate for tens transfer purposes so that, even when the number of days posted into the last two digits by means of the units and tens keys is smaller than fifteen, the next higher digit value is correspondingly modified to produce the correct result in the output leads. The symbolically indicated pilot lamps L serve to afford easy checking of the number of days posted into the device.

It should be noted that there are different ways of posting the number of days. The simplest way is to use a tabulation indicating for each calendar date the number of days remaining till the end of the year, assuming a duration of thirty days for each month, for example. However, if desired, the time-factor setting device can be wired to enter the number of days simply by posting the date of each day into the device. Furthermore, both posting possibilities can be provided beside each other for selective use in order to render the apparatus more versatile.

As an example, assume that the day number 203 is to be posted and that the current circuits for debit and credit entries are to be traced in FIG. 4 when a debit key in the keyboard of the accounting machine BN is depressed, this key closes the switch DB shown in FIG. 4 so that the debit line 34 is connected to the current source 32. For the bank of hundreds keys 000 to 300, the actuation of key 200 completes a circuit extending from source 32 through closed switch DB and the debit line 34, thence through a diode 21 and the closed contact H21 of key 200 to the output lead $2 \times 10^2$ in group 35c. For the tens bank of keys 00 to 90, the actuation of key 00 completes a circuit from debit line 34 through a diode 22 and contact Z01 to the outlet lead $0 \times 10^1$ of group 35d. For the unit bank of keys 0 to 9, the actuation of contact 3 completes a circuit from the debit line 34 through a diode 23 and the contact E31 to the lead $3 \times 10^0$ in group 35a. Consequently, voltage from source 32 is now applied to those outlet leads that correspond, for debit accounting, to the number of days actually posted into the keys of the device TFK, these outlet keys being connected with corresponding input terminals of the computer as described above.

When depressing the key 00, its contact Z05 closes so that the relay T is energized and switches its contacts T1–T4. Analogously, when the key 3 is depressed, the contact E34 closes and energizes the relay R which switches its contacts R1–R4. If now voltage is impressed upon the credit line 33 by closing of the switch CR which is actuated by a credit key in the keyboard of the accounting machine BN, then current passes through the contacts H05, T2, a diode 24, and a contact H23 of key 200 to the outlet lead $1 \times 10^2$. The current also passes from contact H05 through the contacts R1, Z03 to the output lead $8 \times 10^1$, and also from contacts H05 through contact E32 to the lead $8 \times 10^0$, so that those output leads are now connected to voltage that corresponds to the day-number value diminished by fifteen.

An interest accounting operation may take place as follows. The applicable rate of interest is set by depressing the proper key A, B, C or D (FIG. 2). As mentioned, this setting, as a rule, may remain undisturbed for a great number of accounts or for long periods of time. Then the proper credit or debit key in bank MK or DK is actuated by the operator, thus preparing the time-factor entering device TFK for operation by closing of one of the switch contacts CS, DS (FIG. 4). The operator then posts in banks AK the amount on which interest is due and releases a machine run to enter this amount. This causes closing of switch 12a (FIG 3) and causes the computer TR to furnish the computed amount of interest to the printer and totalizer of the accounting machine BN.

The time-factor keyboard according to FIG. 4 is preferably embodied in a separate unit as shown in FIG. 1. If desired, however, this device may also be combined with the business machine BN or with the interest-rate setting device IRK. The provision of a separate unit or of a combined IRK-TFK device with a single keyboard are preferable because such a device can readily be connected with an available business machine and with an available standard computer in order to provide for automatic computation of interest amounts in accordance with a desired rate of interest.

It will also be apparent from the foregoing that the time-factor setting device is also applicable in all cases where a selected diminution of a numerical value by a predetermined constant value is required.

The modified interest-rate setting device shown in FIG. 5, applicable in lieu of the one shown in FIG. 3 comprises a multi-socket assembly 14 for each of the four panels 14a, b, c, d shown in FIG. 3. If used for the same number of digits as the panels according to FIG. 3, each socket assembly 14 has seven digital rows of sockets such as the one denoted by 17. The seventy sockets are connected with seventy individual leads collectively denoted by 15a. The socket assembly 14 has another contact socket 18 connected with a lead 13a which corresponds to the lead 13a in FIG. 3 and is connected with one of the switch contacts to be actuated by the appertaining key, such as by key A for example.

A single multi-pin contact plug 19 can be inserted into the sockets of the plate 14. There are a number of selectively applicable plugs 19 which differ from each other only by the interwiring of the plug pins. For example, the plug 19 shown in FIG. 5 is marked on its back as corresponding to the interest rate of 3%. Accordingly, the plug pins are interwired in the same manner as described above with reference to FIG. 3 relative to the socket panel 14a. That is, the pin engageable with the additional socket 18 is electrically connected within the body of the plug 19 with one selected pin in each of the seven rows of pins. In another plug of the group, the pin corresponding to socket 18 is electrically connected with a different selection of one pin in each of the seven rows of pins. When the equipment is to be set to different interest rates, it is only necessary to remove the plug 19 and to substitute it by a correspondingly different plug which is identified by the interest rate for which it is internally wired.

It will be understood that the above-mentioned number of seven digital rows is given only by way of example. The number of digits can be chosen at will, depending upon the desired degree of accuracy and in accordance with the digital capacity of the computer being used. It is further obvious that in selector plugs such as the one denoted by 19 in FIG. 5, those pins that are not electrically active can be eliminated. However, it has been advantageous to use a number of plugs, all have the same number of plug pins, because this affords employing commercially available multi-pin electric couplings and permits changing the internal wiring of a plug, if desired.

Another modification of the interest-rate setting device is illustrated in FIG. 6. It consists essentially of a commercially available rotary selector switch which may take the place of the plug-in devices previously described. The switch comprises a shaft 100 which is rotatable relative to a number of circular insulating plates 101–108 and is electrically connected with a slide contact 109. When the shaft is being turned manually by means of a knob 114, the contact 109 enters sequentially into contact engagement with one of ten bank contact segments, such as those denoted by 110 and 111, on each of the insulating plates 102 to 108, a separate slide contact 109 being provided for each of the insulating plates. A brush contact 212 is provided for connecting the shaft 110 and hence all slide contacts 109 to a voltage source corresponding to the source 12 in FIG. 3. The individual fixed bank contacts 111 are connected by wires 113 with the electronic computer, these wires corresponding to the group of output leads denoted by 16 in FIGS. 1 and 3. One bank contact, namely the contact 110, on each insulating plate is insulated. Consequently, when the shaft 100 is placed in zero position by means of the knob 114, the slide contact 109 is in engagement with the dead bank contact 110, and the selector switch is turned off.

The proper rate of interest is set by selectively turning the knob 114 to one of the positions A, B, C, D. The interest factor thus adjusted can remain adjusted for any desired length of time in analogy with the adjustment effected by operation of the keys, A, B, C, D in the embodiment described above with reference to FIGS. 1, 2 and 3.

It will be noted that in FIG. 6, seven insulating plates 102 to 108 are shown, corresponding to seven digits. Any desired other number of plates and hence individual switching units can be chosen, depending upon the number of digital values to be transmitted to the computer.

The schematic block diagram in FIG. 7 shows two accounting machines BN, each being connected with its own time-factor setting device TFK, which cooperate with only one electronic computer TR. Such a combination of two or more business machines with a single computer, reducing the space requirements and investment cost, is possible by virtue of the fact that the electronic computer performs the individual multiplying operations within a very short interval of time amount to no more than a small fraction of one second.

It will be apparent to those skilled in the art, upon studying this disclosure, that our invention permits of a variety of modifications and hence may be given embodiments other than particularly illustrated and described herein, without departing from the essential features of the invention and within the scope of the claims annexed hereto.

We claim:

1. In combination with a multiplying digital computer, an interest-computing business apparatus comprising selective interest-rate setting means connected with the computer to supply thereto a first factorial input; and a time-factor entering device for entering the number of interest days and for entering said number of interest days reduced by a given number, said time-factor entering device comprising selectively actuable credit-identifying and debit-identifying means, and selectively actuable date posting means, said time-factor entering device having digital output circuits connected to said computer to supply thereto a second factorial input, and discriminating means connected across said output circuits and with said date posting means under control by said identifying means to give said second input respective values differing from each other a given amount depending upon which of said two identifying means is actuated, and means for connecting to said computer an accounting machine to supply to said computer a third factorial input corresponding to a number of capital units determined by said accounting machine whereby said computer furnishes a product value of said three inputs indicative of the amount of interest for said number of capital units.

2. In a business machine apparatus having a multiplier, an interest-computing apparatus comprising a selectively actuable interest-rate setting device having first digital electric output circuits adapted to be connected with the multiplier to supply thereto a rate-factor input; and a selectively actuable time-factor setting device for entering the number of interest days and for entering said number of interest days reduced by a given number, said time-factor entering device having second digital electric output circuits adapted to be connected with the multiplier to supply thereto a time-factor input; said interest-rate setting device having manually actuable selector means indicative of respectively different interest rates, respective electric switch means connected with said selector means to be controlled thereby, each of said switch means being electrically connected with one of different digital combinations of said first output circuits, said one digital combination corresponding to a numerical value equal to the product of selected interest rate times the number of days per year; said time-factor setting device having a number of selectively actuable keys for posting date-identifying data, respective electric switch means connected with said keys to be controlled thereby, selectively actuable credit-identifying and debit-identifying means connected across said second output circuits and with said latter switch means and adapted to selectively complete the connection of said second output circuits with the multiplier to give said time-factor respective values differing from each other a given amount depending upon which of said two identifying means is actuated, whereby said multiplier furnishes a product value indicative of the amount of interest per capital unit.

3. In a business machine apparatus having a multiplier, an interest-computing business apparatus comprising a selectively actuable interest-rate setting device having first digital electric output circuits adapted to be connected with the multiplier to supply thereto a rate-factor input; and a selectively actuable time-factor setting device for entering the number of interest days and for entering said number of interest days reduced by a given number, said time-factor entering device having second digital electric output circuits adapted to be connected with the multiplier to supply thereto a time-factor input; said interest-rate setting device having a first group of selectively actuable keys indicative of respectively different interest rates, respective electric switch means connected with said respective first-group keys to be controlled thereby, voltage-supply means, a number of connector devices each having an input lead connected with said voltage supply means through one of said respective switch means, said connector devices being selectively pre-settable to respectively different combinations of connections between said input lead and said first digital output circuits, the combination of connections of each of said connector devices corresponding to a numerical multi-digit value equal to the product of the selected interest rate times the number of days per year; said time-factor setting device having a second group of selectively actuable keys for posting date-identifying data, respective electric switch means connected with said second-group keys to be controlled thereby selectively actuable credit-identifying and debit-identifying means connected across said second output circuits and with said latter switch means and adapted to selectively complete the connection of said second output circuits with the multiplier to give said time-factor respective values differing from each other a given amount depending upon which of said two identifying means is actuated, whereby said multiplier furnishes a product value indicative of the amount of interest per capital unit.

4. In a business machine apparatus having a multiplier, an interest-computing apparatus comprising selective interest-rate setting means adapted to be connected with the multiplier to supply thereto a first factorial input; and an electrical time-factor entering device for entering into said apparatus a value corresponding to a number of interest days, and for entering another value corresponding to said number of interest days reduced by any given other number of interest days, said time-factor entering device comprising selectively actuable credit-identifying and debit-identifying means, and selectively actuable date posting means, said time-factor entering device having output circuits for connection to said multiplier adapted to supply thereto a second factorial input, and discriminating means connected across said output circuits and with said date posting means under control by said identifying means to give said second input respective values differing from each other a given amount depending upon which of said two identifying means is actuated, whereby said multiplier can furnish a product value indicative of the amount of interest per capital unit.

5. In combination with a multiplying digital computer, an accounting machine having a balance registering mechanism, a printing device and a totalizer; an interest-computing business apparatus comprising selective interest-rate setting means connected with the computer to supply thereto a first factorial input; and an electrical time-factor entering device for entering into said apparatus a value corresponding to a number of interest days, and for entering another value corresponding to said number of interest days reduced by any given other number of interest days, said time-factor entering device comprising selectively actuable credit-identifying and debit-identifying means, and selectively actuable date posting means, said time-factor entering device having digital output circuits connected to said computer to supply thereto a second factorial input, and discriminating means connected across said output circuits and with said date posting means under control by said identifying means to give said second input respective values differing from each other a given amount depending upon which of said two identifying means is actuated; means connecting said accounting machine to said computer to supply thereto a third factorial input corresponding to a number of capital units determined by the balance registering mechanism of said accounting machine, and output means connected from said computer to said printer and to said totalizer for furnishing thereto a product value of said three inputs indicative of the amount of interest for said number of capital units.

6. In a business machine apparatus having a multiplier, an interest-computing business apparatus comprising a selectively actuable interest-rate setting device having first digital electric output circuits adapted to be connected with the multiplier to supply thereto a rate-factor input; and a selectively actuable time-factor setting device having second digital electric output circiuts adapted to be connected with the multiplier to supply thereto a time-factor input; said interest-rate setting device having a first group of selectively actuable keys indicative of respectively different interest rates, respective electric switch means connected with said respective first-group keys to be controlled thereby, voltage-supply means, a number of connector devices each having an input lead connected with said voltage supply means through one of said respective switch means, said connector devices being selectively pre-settable to respectively different combinations of connections between said input lead and said first digital output circuits, the combination of connections of each of said connector devices corresponding to a numerical multi-digit value equal to the product of the selected interest rate times the number of days per year; said time-factor setting device having a second group of selectively actuable keys for posting date-identifying data, respective electric switch means connected with said second-group keys to be controlled thereby, selectively actuable credit-identifying and debit-identifying means connected with said second output circuits and said latter switch means and adapted to selectively complete the connection of said second output circuits with the multiplier to give said time-factor respective values differing from each other a given amount depending upon which of said two identifying means is actuated, whereby said multiplier furnishes a product value indicative of the amount of interest per capital unit, each of said connector devices comprising a socket panel having digital rows of connector sockets, said sockets being connected to said first output circuits respectively, each digital row of sockets having a connector plug connected to said input lead and insertable into a selected one socket of the row.

7. In a business machine apparatus having a multiplier, an interest-computing business apparatus comprising a selectively actuable interest-rate setting device having first digital electric output circuits adapted to be connected within the multiplier to supply thereto a rate factor input; and a selectively actuable time-factor setting device having second digital electric output circuits adapted to be connected with the multiplier to supply thereto a time-factor input; said interest-rate setting device having a first group of selectively actuable keys indicative of respectively different interest rates, respective electric switch means connected with said respective first-group keys to be controlled thereby, voltage-supply means, a number of connector devices each having an input lead connected with said voltage supply means through one of said respective switch means, said connector devices being selectively pre-settable to respectively different combinations of connections between said input lead and said first digital output circuits, and combination of connections of each of said connector devices corresponding to a numerical multi-digit value equal to the product of the selected interest rate times the number of days per year, said time-factor setting device having a second group of selectively actuable keys for posting date-identifying data, respective electric switch means connected with said second-group keys to be controlled thereby, selectively actuable credit-identifying and debit-identifying means connected with said second output circuits and said latter switch means and adapted to selectively complete the connection of said second output circuits with the multiplier to give said time-factor respective values differing from each other a given amount depending upon which of said two identifying means is actuated, whereby said multiplier furnishes a product value indicative of the amount of interest per capital unit, each of said connector devices comprising a multi-socket connector member having digital rows of connector sockets, said sockets being connected to said first output circuits respectively, said socket member having another socket connected to said input lead, and a group of selective multi-plug members each having plug pins engageable with said sockets, said multi-plug members having their plug pins differently interwired in accordance with respectively different interest rates whereby each of the plug members of the group connects said input lead with a selected one of said combination of connections.

8. In a business machine apparatus having a multiplier, an interest-computing apparatus comprising a selectively actuable interest-rate setting device having first digital electric output circuits adapted to be connected with the multiplier to supply thereto a rate-factor input; and a selectively actuable time-factor setting device having second digital electric output circuits adapted to be connected with the multiplier to supply thereto a time-factor input; said interest-rate setting device having manually actuable selector means indicative of respectively different interest rates, respective electric switch means connected with said selector means to be controlled thereby, each of said switch means being electrically connected with one of different digital combinations of said first output circuits, said one digital combination corresponding to a numerical value equal to the product of selected interest rate times the number of days per year; said time-factor setting device having a number of selectively actuable keys for posting date-identifying data, respective electric switch means connected with said keys to be controlled thereby, selectively actuable credit-identifying and debit-identifying means connected with said second output circuits and said latter switch means and adapted to selectively complete the connection of said second output circuits with the multiplier to give said time-factor respective values differing from each other a given amount depending upon which of said two identifying means is actuated, whereby said multiplier furnishes a product value indicative of the amount of interest per capital unit, said interest-rate setting means comprising a selector switch adjustable to one of a number of positions corresponding to respectively different interest rates, and said respective switch means of said interest-rate setting means being constituted by switching units of said selector switch, said units corresponding to respectively different rate-factor digits and having a sequence of bank contacts connected to said first output circuits respectively, said selector switch having selector contact means in each of said units engageable with one of said bank contacts of said unit at a time and electrically connected to said input lead, whereby a different rate factor is selectively set in each position of said selector switch.

9. In a business machine apparatus having a multiplier, an interest-computing apparatus comprising a selectively actuable interest-rate setting device having first digital electric output circuits adapted to be connected with the multiplier to supply thereto a rate-factor input; and a selectively actuable time-factor setting device having second digital electric output circuits adapted to be connected with the multiplier to supply thereto a time-factor input; said interest-rate setting device having manually actuable selector means indicative of respectively different interest rates, respective electric switch means connected with said selector means to be controlled thereby, each of said switch means being electrically connected with one of different digital combinations of said first output circuits, said one digital combination corresponding to a numerical value equal to the product of selected interest rate times the number of days per year; said time-factor setting device having a number of selectively actuable keys for posting date-identifying data, respective electric switch means connected with said keys to be controlled thereby, selectively actuable credit-identifying and debit-identifying means connected with said second output circuits and said latter switch means and adapted to selectively complete the connection of said second output circuits with the multiplier to give said time-factor respective values differing from each other a given amount depending upon which of said two identifying means is actuated, whereby said multiplier furnishes a product value indicative of the amount of interest per capital unit and voltage supply means, said credit-identifying means and said debit-identifying means having a credit lead and a debit lead connectable to said voltage supply means, and respective selectively actuable switching means alternating connecting one of said credit and debit lines to said voltage supply means in dependence upon registering of credit and debit operations respectively, said credit and debit leads being differently wired relative to said second output circuits to provide for said respective different time-factor values.

10. In interest-computing apparatus according to claim 9, said discriminating means comprising selectively actuable relay means connected to said credit and debit leads to be discriminately actuated depending upon which of said two leads is connected to said voltage supply means at a time, said relay means being interposed between said key-controlled switch means and said second output circuits so that said time-factor value is identical with the number corresponding to the posted data for debit operation but differs therefrom a given amount for credit operation.

11. Interest-computing apparatus according to claim 10, comprising pilot lamps correlated to said respective keys of said time-factor setting device and controlled by said key-controlled switch means of said time-factor setting device.

12. In a business machine apparatus having a multiplier, an interest-computing apparatus comprising selective interest-rate setting means adapted to be connected with the multiplier to supply thereto a first factorial input; and a time-factor entering device comprising selectively actuable credit-identifying and debti-identifying means, and selectively actuable date posting means, said time-factor entering device having output circuits for connection to said multiplier adapted to supply thereto a second factorial input, and discriminating means connected with said output circuits and said date posting means under control by said identifying means to give said second input respective values differing from each other a given amount depending upon which of said two identifying means is actuated, whereby said multiplier can furnish a product value indicative of the amount of interest per capital unit, said interest-computing apparatus comprising an accounting machine having a keyboard with keys for credit transaction and keys for debit transactions, said credit and debit transaction keys constituting said respective credit-identifying and debit-identifying means of said time-factor entering device.

13. In a business machine apparatus having a multiplier, an interest-computing business apparatus comprising a selectively actuable interest-rate setting device having first digital electric output circuits adapted to be connected with the multiplier to supply thereto a rate-factor input; and a selectively actuable time-factor setting device having second digital electric output circuits adapted to be connected with the multiplier to supply thereto a time-factor input; said interest-rate setting device having a first group of selectively actuable keys indicative of respectively different interest rates, respective electric switch means connected with said respective first-group keys to be controlled thereby, voltage-supply means, a number of connector devices each having an input lead connected with said voltage supply means through one of said respective switch means, said connector devices being selectively pre-settable to respectively different combinations of connections between said input lead and said first digital output circuits, the combination of connections of each of said connector devices corresponding to a numerical multi-digit value equal to the product of the selected interest rate times the number of days per year; said time factor setting device having a second group of selectively actuable keys for posting date-identifying data, respective electric switch means connected with said second-group keys to be controlled thereby selectively actuable credit-identifying and debit-identifying means connected with second output circuits and said latter switch means and adapted to selectively complete the connection of said second output circuits with the multiplier to give said time-factor respective values differing from each of a given amount depending upon which of said two identifying means is actuated, whereby said multiplier furnishes a product value indicative of the amount of interest per capital unit and an accounting machine having a keyboard with keys for credit transactions and keys for debit transactions, said credit and debit transaction keys constituting said respective credit-identifying and debit-identifying means of said time-factor entering device, said first group of keys indicative of interest rates forming part of said accounting-machine keyboard.

14. In a business machine apparatus having a multiplier, an interest-computing apparatus comprising selective interest-rate setting means adapted to be connected with the multiplier to supply thereto a first factorial input; and a time-factor entering device comprising selectively actuable credit-identifying and debit-identifying means, and selectively actuable date posting means, said time-factor entering device having output circuits for connection to said multiplier adapted to supply thereto a second factorial input, and discriminating means connected with said output circuits and said date posting means under control by said identifying means to give said second input respective values differing from each other a given amount depending upon which of said two identifying means is actuated, whereby said multiplier can furnish a product value indicative of the amount of interest per capital unit, said interest-computing apparatus comprising an accounting machine having a keyboard with keys for credit transactions and key for debit transactions, said credit and debit transaction keys constituting said respective credit-identifying debit-identifying means of said time-factor entering device, said accounting machine having amount registering means adapted to be connected with the multiplier for causing the same to multiply said product with an amount on which interest is due, and said accounting machine having totalizer means adapted to be connected with the multiplier for registering said latter product as indicative of the total amount of interest.

15. In combination with a multiplying a digital computer, an interest-computing business apparatus comprising selective interest-rate setting means connected with said computer for supplying thereto a first factorial input corresponding to a selected interest rate, a time-factor entering device connected with the computer for supplying thereto a second factorial input corresponding to a number of interest days, and electrical control means for reducing said number of interest days by any given other number of interest days so as to give said second input respective values differing from each other by said given other number.

16. Business apparatus according to claim 15, and including contact control means for affecting a next higher decimal position of accuracy in said number of interest days, reduced by said given number.

References Cited by the Examiner
UNITED STATES PATENTS

| | | | |
|---|---|---|---|
| Re. 22,947 | 12/1947 | Clary et al. | 235—161 |
| 2,176,933 | 10/1939 | Smith | 235—204.6 X |
| 2,682,993 | 7/1954 | Helgeson | 235—23 |

ROBERT C. BAILEY, *Primary Examiner.*

WALTER W. BURNS, JR., MALCOLM A. MORRISON,
*Examiners.*